(12) United States Patent
Nakanishi

(10) Patent No.: US 11,625,126 B2
(45) Date of Patent: Apr. 11, 2023

(54) DISPLAY AND INPUT DEVICE THAT CORRECTS POSITION OF SPATIAL OBJECT, ON BASIS OF POSITION SHIFT OF CONTACTLESS TOUCH OPERATION PERFORMED ON SPATIAL OBJECT

(71) Applicant: KYOCERA Document Solutions Inc., Osaka (JP)

(72) Inventor: Shinichi Nakanishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/831,983

(22) Filed: Jun. 3, 2022

(65) Prior Publication Data

US 2022/0391035 A1    Dec. 8, 2022

(30) Foreign Application Priority Data

Jun. 4, 2021  (JP) ................................. 2021-094669

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 2009/0106655 A1 | 4/2009 | Grant et al. | |
| 2009/0219255 A1* | 9/2009 | Woolley | G06F 3/0446 |
| | | | 345/173 |
| 2015/0109218 A1* | 4/2015 | Satou | G06F 1/3265 |
| | | | 345/173 |

FOREIGN PATENT DOCUMENTS

JP        2015158912 A      9/2015

* cited by examiner

*Primary Examiner* — Stephen T. Reed
(74) *Attorney, Agent, or Firm* — IP Business Solutions, LLC

(57) ABSTRACT

A display and input device includes a display device, a contactless position detector, and a controller. The display device displays an operable object on a screen. The contactless position detector detects a position of a contactless touch operation performed on a spatial object, predefined at a position corresponding to the operable object separated from the screen by a predetermined distance. The controller includes a processor, and detects, when the processor executes a control program, a position shift of the contactless touch operation with respect to a center of the spatial object, when the position of the contactless touch operation detected by the contactless position detector is in the spatial object, and corrects the position of the spatial object by making the center of the spatial object coincide with the position of the contactless touch operation, on a basis of the detected position shift.

5 Claims, 9 Drawing Sheets

Fig.3

| OPERABLE OBJECT | COORDINATE OF OPERABLE OBJECT ON COORDINATE SYSTEM OF SCREEN | COORDINATE OF SPATIAL OBJECT ON SPATIAL COORDINATE SYSTEM |
|---|---|---|
| BUTTON | $(x',y')$, $(x',y')$ $(x',y')$, $(x',y')$ | $(x,y)$, $(x,y)$ $(x,y)$, $(x,y)$ |
| KEY | $(x',y')$, $(x',y')$ $(x',y')$, $(x',y')$ | $(x,y)$, $(x,y)$ $(x,y)$, $(x,y)$ |
| ICON | $(x',y')$, $(x',y')$ $(x',y')$, $(x',y')$ | $(x,y)$, $(x,y)$ $(x,y)$, $(x,y)$ |

DT

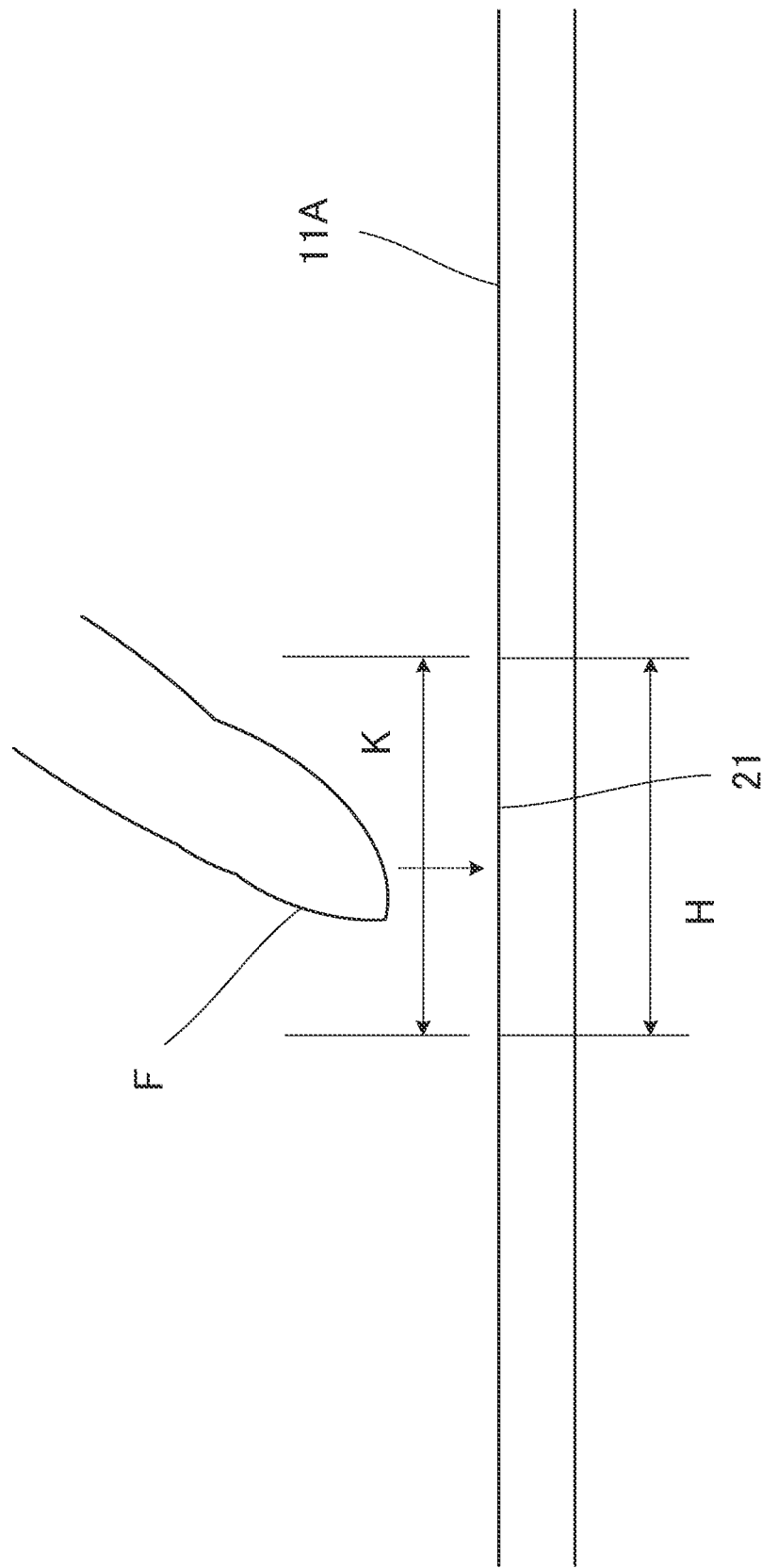

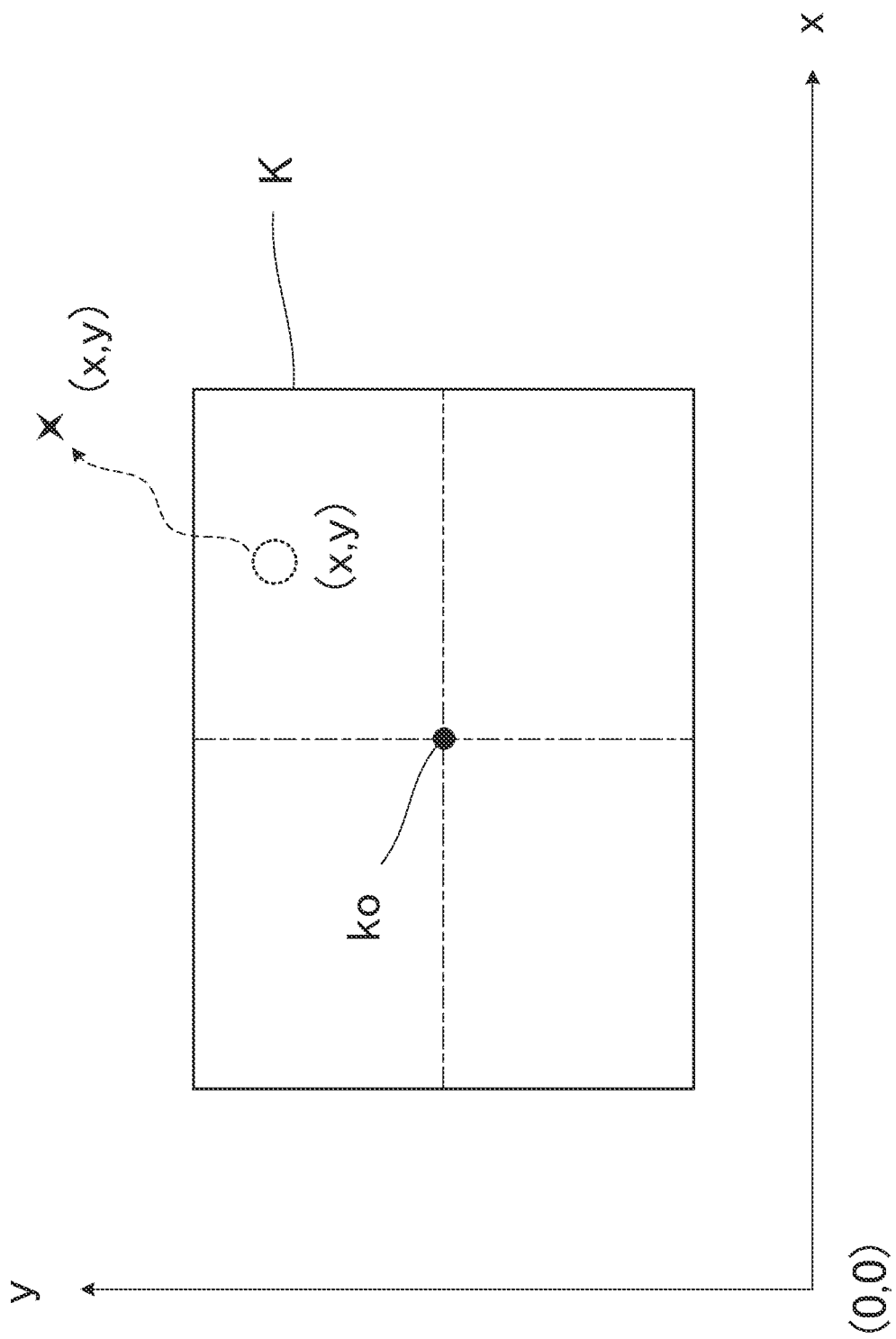

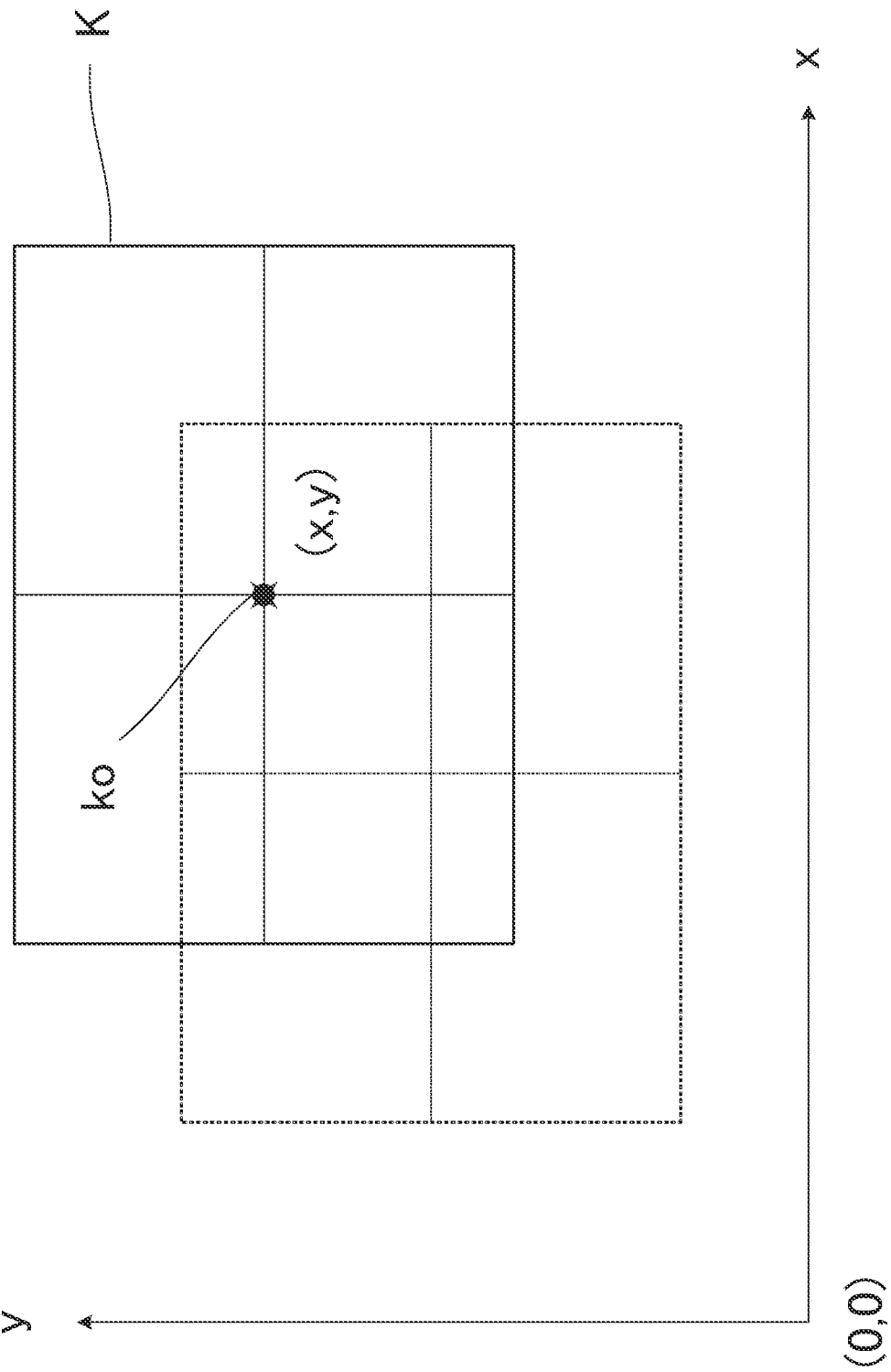

DISPLAY AND INPUT DEVICE THAT CORRECTS POSITION OF SPATIAL OBJECT, ON BASIS OF POSITION SHIFT OF CONTACTLESS TOUCH OPERATION PERFORMED ON SPATIAL OBJECT

INCORPORATION BY REFERENCE

This application claims priority to Japanese Patent Application No. 2021-094669 filed on Jun. 4, 2021, the entire contents of which are incorporated by reference herein.

BACKGROUND

The present disclosure relates to a display and input device that accepts an input by contactless touch operation, performed without touching the screen of the display device, and in particular to a technique to cope with a position shift of the contactless touch operation.

Display and input devices, for example called a contactless touch panel, are widely known. Such display and input devices are configured to define a spatial object corresponding to an operable object such as a button, a key, or an icon displayed on the screen of the display device, and detect, with a sensor or the like, whether a contactless touch operation has been performed on the spatial object.

For example, a first technique is known that includes detecting the presence of a fingertip of a user located close to the surface of the touch panel, with a proximity sensor, and detecting the position, speed, and acceleration of the fingertip with respect to the surface of the touch panel. According to the first technique, a processor decides whether the fingertip will actually touch the touch panel, on the basis of the position, speed, and acceleration of the fingertip detected by the proximity sensor, calculates the predicted time that the fingertip touches the touch panel, and activates a tactile effect before the fingertip actually touches the touch panel. In addition, a second technique to expand the operable object such as the button, the key, or the icon, thereby preventing an erroneous operation, is known.

SUMMARY

The disclosure proposes further improvement of the foregoing techniques.

In an aspect, the disclosure provides a display and input device includes a display device, a contactless position detector, and a controller. The display device displays an operable object on a screen. The contactless position detector detects a position of a contactless touch operation performed on a spatial object, predefined at a position corresponding to the operable object separated from the screen by a predetermined distance. The controller includes a processor, and detects, when the processor executes a control program, a position shift of the contactless touch operation with respect to a center of the spatial object, when the position of the contactless touch operation detected by the contactless position detector is in the spatial object, and corrects the position of the spatial object by making the center of the spatial object coincide with the position of the contactless touch operation, on a basis of the detected position shift.

BRIEF DESCRIPTION OF THE DRAWINGS

FIG. 3 is a schematic drawing showing a coordinate table;

FIG. 4 is a side view showing a user's fingertip being brought close to the screen of the display device;

FIG. 5A to 5C are schematic drawings for explaining an operation for correcting a position on a spatial object, on the basis of a position shift of the fingertip performing the contactless touch operation;

DETAILED DESCRIPTION

Hereafter, an embodiment of the disclosure will be described, with reference to the drawings.

Figure 1:
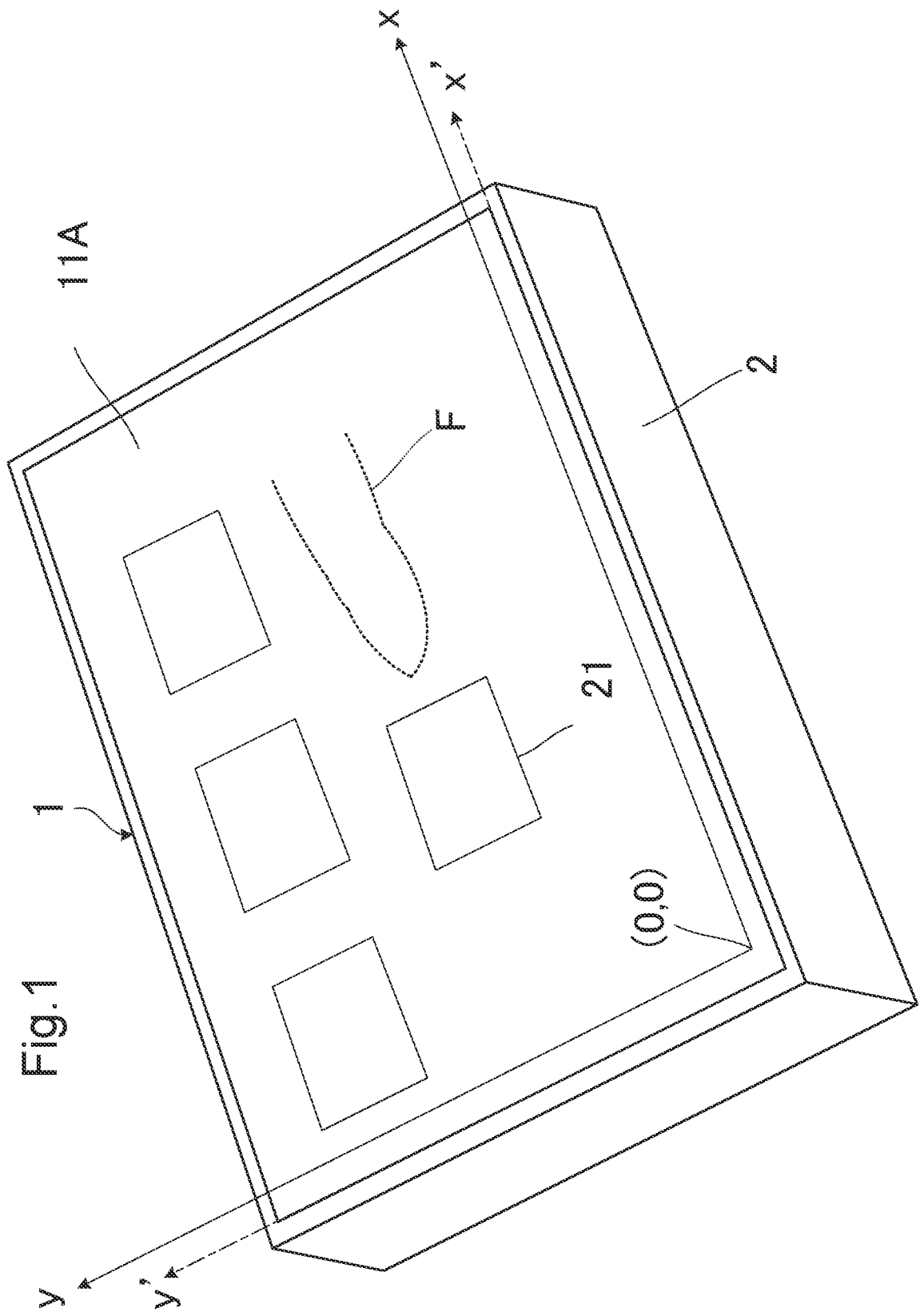
FIG. 1 is a schematic perspective view showing the appearance of a display and input device according to an embodiment of the disclosure.
Figure 2:
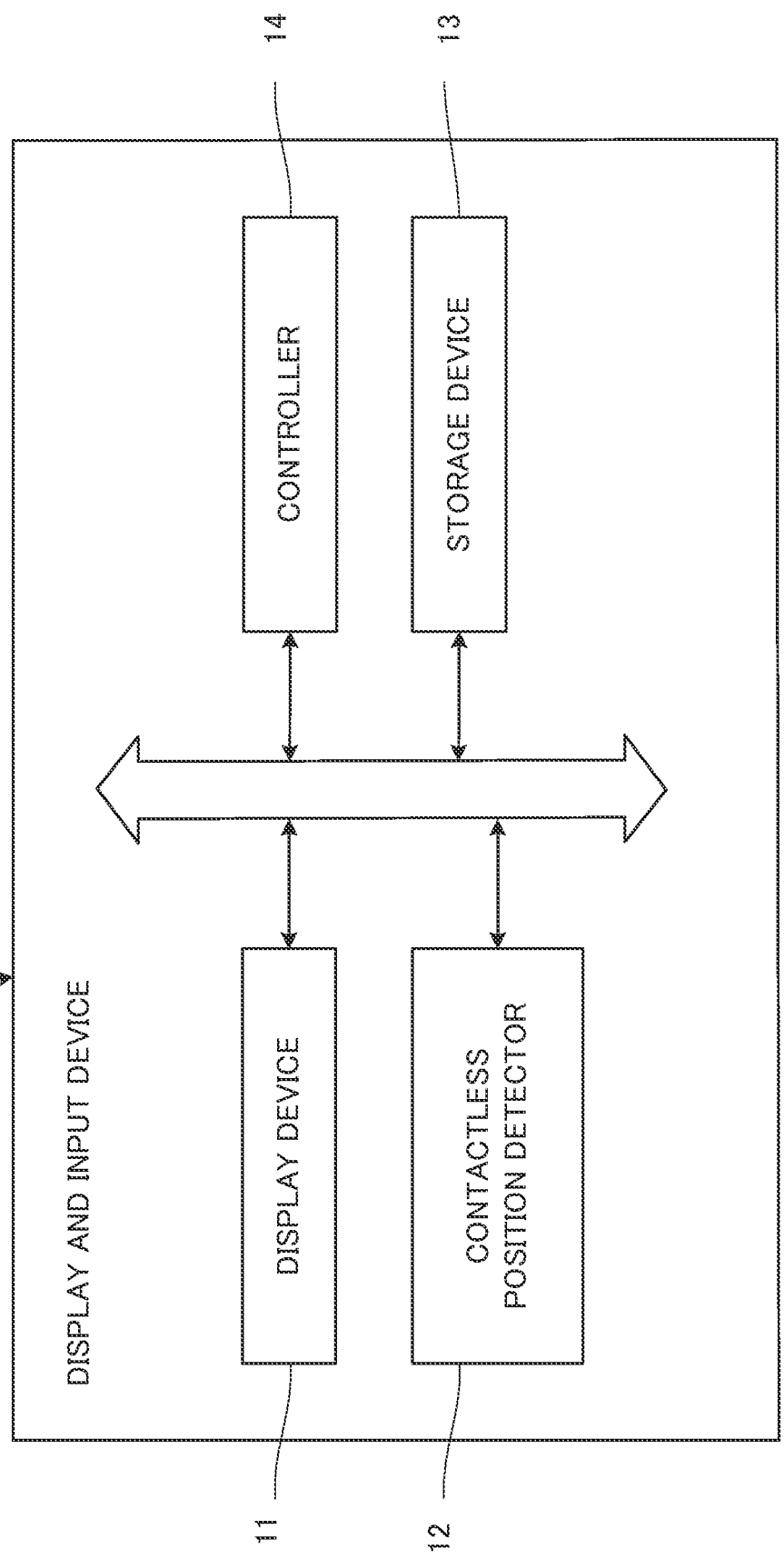
FIG. 2 is a block diagram showing an essential configuration of the display and input device.

FIG. 1 is a schematic perspective view showing the appearance of a display and input device 1 according to the embodiment of the disclosure. FIG. 2 is a block diagram showing an essential configuration of the display and input device 1. The display and input device 1 includes a display device 11, a contactless position detector 12, a storage device 13, and a controller 14.

The display device 11 is, for example, constituted of a liquid crystal display (LCD) or an organic light-emitting diode (OLED). A screen 11A of the display device 11 is supported by a housing 2 serving as a frame.

The contactless position detector 12 detects a fingertip or the like that has come close to the screen 11A of the display device 11, while the fingertip or the like is not in contact with the screen 11A. For example, the contactless position detector 12 includes a plurality of sensors located at predetermined positions on the screen 11A. The contactless position detector 12 also includes a detection circuit that detects a change in electrostatic capacitance between the fingertip located close to the screen 11A but not yet in contact therewith, and the plurality of sensors on the screen 11A. The contactless position detector 12 detects the position of the fingertip (xy-coordinate and the distance to the screen 11A), on the basis of the change in electrostatic capacitance detected by the detection circuit. The contactless detection based on the change in electrostatic capacitance is performed by a known method.

The storage device 13 contains various types of data and programs. The storage device 13 includes, for example, a random-access memory (RAM), and a read-only memory (ROM).

The controller 14 includes a processor, a random-access memory (RAM), and a read-only memory (ROM). The processor is, for example, a central processing unit (CPU), an application specific integrated circuit (ASIC), or a micro processing unit (MPU). The controller 14 executes the undermentioned operations, when the processor operates according to a control program stored in the ROM. For example, the controller 14 acts as a processing unit that executes various operations necessary for realizing the display on the display device 11. The controller 14 also receives an operational instruction inputted by the user, on the basis of the position of the fingertip detected by the contactless position detector 12.

In the display and input device 1, the controller 14 contains, as shown in FIG. 1, a coordinate system including an x-axis parallel to the horizontal sides of the screen 11A a y-axis parallel to the vertical sides of the screen 11A, and the origin (0,0) where the x-axis and the y-axis intersect, the coordinate system being separated from the screen 11A of the display device 11 by a predetermined distance, and located along a spatial plane parallel to the screen 11A. Hereinafter, such coordinate system will be referred to as a spatial coordinate system. The controller 14 stores the mentioned setting, for example in the RAM.

On the screen 11A, a coordinate system composed of an x'-axis extending along one of the horizontal sides of the screen 11A, a y'-axis extending along one of the vertical sides of the screen 11A, and the origin where the x'-axis and the y'-axis intersect, is defined. Hereinafter, such coordinate system will be referred to as a coordinate system of the screen.

The spatial coordinate system and the coordinate system of the screen are separated from each other by a predetermined distance, in a direction orthogonal to the screen 11A and these coordinate systems. The controller 14 causes the display device 11 to display an operable object such as a button, a key, or an icon on the screen 11A, on the basis of such relation. The controller 14 defines the operable object, parallelly displaced from the coordinate system of the screen to the spatial coordinate system, and located on the spatial coordinate system, as a spatial object. The controller 14 stores such setting, for example in the RAM.

For example, when a button 21 is displayed on the screen 11A, the controller 14 defines the operable object corresponding to the button 21, located at the position parallelly displaced from the coordinate system of the screen to the spatial coordinate system, as the spatial object. In other words, the controller 14 defines the spatial object corresponding to the operable object of the button 21 displayed on the screen 11A, on the spatial coordinate system.

The storage device 13 contains in advance, as shown in FIG. 3, a coordinate table DT in which each of the operable objects such as the button, the key, and the icon, the position data of the operable objects on the coordinate system of the screen, and the position data of the spatial objects, respectively corresponding to the operable objects, on the spatial coordinate system, are registered. The position data of the operable object is expressed by the coordinate (x', y') indicating the position of each of the corners of the operable object (rectangular shape) on the coordinate system of the screen. The position data of the spatial object is expressed by the coordinate (x, y) indicating the position of each of the corners of the spatial object (rectangular shape) on the spatial coordinate system.

Now, when the user brings his/her fingertip F close to the button 21 on the screen 11A, but without touching the same as shown in FIG. 4, the contactless position detector 12 detects the position of the fingertip F. The controller 14 detects that the fingertip F has entered a spatial object K (spatial coordinate system) corresponding to an operable object H (coordinate system of the screen) of the button 21, according to the detection result from the contactless position detector 12, and decides that the contactless touch operation has been started. When the contactless position detector 12 detects the state where the fingertip F has moved to a position separated from the spatial object K, the controller 14 confirms, at the time point that the fingertip F has moved, that the contactless touch operation has been performed by the fingertip F, on the operable object H of the button 21. Upon confirming as above, the controller 14 decides that the button 21 has been pressed.

For example, the contactless position detector 12 detects the coordinate (x, y) of the user's fingertip on the spatial coordinate system. When the contactless position detector 12 starts to detect the coordinate (x, y) of the fingertip, the controller 14 acquires the coordinate (x, y) of the fingertip at the time that the contactless touch operation has been started, and then acquires the coordinate (x, y) of the fingertip at the time that the contactless touch operation, detected by the contactless position detector 12, has been finished, in other words the coordinate (x, y) of the fingertip immediately before the user moves the fingertip away from the spatial object. The controller 14 looks up the position data of the spatial objects registered in the coordinate table DT stored in the storage device 13, to thereby identify the spatial object that includes the coordinate (x, y) of the fingertip at the time that the contactless touch operation has been finished. The controller 14 the retrieves the operable object (e.g., button) corresponding to the spatial object, from the coordinate table DT, and decides that the retrieved operable object has been operated. Thus, the controller 14 executes the function corresponding to the operable object that has been operated.

As described above, the user can perform the contactless touch operation on the operable object displayed on the screen 11A, without bringing the fingertip into contact with the screen 11A. When the user moves the fingertip from the spatial object corresponding to the operable object, to a position inside the spatial object on the xy-coordinate, and separated from the screen 11A by a distance equal to or longer than the predetermined distance, the controller 14 accepts the contactless touch operation performed on the operable object, at the time point that the fingertip has been moved. On the other hand, when the user moves the fingertip, after once putting the fingertip on the spatial object, to outside of the spatial object on the xy-coordinate, and then moves the fingertip to a position separated from the screen 11A by a distance equal to or longer than the predetermined distance, the controller 14 does not accept the contactless touch operation on the operable object, in other words intentionally cancels the contactless touch operation on the operable object.

Now, when the user views the screen 11A from an oblique angle, instead of straight ahead, the spatial coordinate system and the coordinate system of the screen look as if overlapping obliquely. In other words, the spatial coordinate system and the coordinate system of the screen look deviated from each other, to the user's eyes. In this case, it becomes difficult for the user to accurately recognize the position of the spatial object corresponding to the operable object of the button 21 displayed on the screen 11A, and therefore the user may perform the contactless touch operation at a position shifted from the center of the spatial object on the xy-coordinate (hereinafter, simply "center of the spatial object"). As long as the user keeps viewing the screen 11A of the display device 11 obliquely, the user repeats the contactless touch operation at a shifted position.

In addition, in the case of inputting an instruction through the contactless touch operation on the spatial object corresponding to the operable object, with the fingertip being separated from the screen 11A of the display device 1, the position of the fingertip may fluctuate on the xy-coordinate, since the fingertip is floating in the air, and thus an erroneous operation may be incurred. For example, although the user intends to input the instruction through the spatial object corresponding to one of the operable objects such as the button, the key, or the icon displayed on the screen 11A, the user may fail to accurately perform the contactless touch operation on the desired spatial object, owing to position fluctuation of the fingertip. Moreover, since the fingertip is floating in the air, it is difficult for the user to recognize whether the spatial object has been accurately touched, in other words whether an erroneous operation has been committed.

The foregoing first known technique, including deciding whether the fingertip will actually make contact, on the basis of the position, speed, and acceleration of the fingertip detected by the touch panel proximity sensor, is not designed to prevent the error of the contactless touch operation.

Further, although the second known technique includes expanding the operable object, in the case of a soft keyboard on which a plurality of buttons are arranged, the buttons are often located close to each other, and therefore a sufficient vacant region for expanding the button is unavailable. In addition, when the button is expanded, the fingertip that has performed the contactless touch operation has to be moved over a long distance, to cancel the contactless touch operation by continuously moving the fingertip that has performed the contactless touch operation to outside of the spatial object corresponding to the button, which makes the action to cancel the contactless touch operation troublesome.

According to this embodiment, in contrast, the controller 14 performs a position correction operation, including detecting the position shift of the fingertip performing the contactless touch operation on the center of the spatial object on the spatial coordinate system, and correcting the position of the spatial object so as to make the center of the spatial object coincide with the position of the fingertip, on the basis of the detected position shift of the fingertip.

Figure 5B:
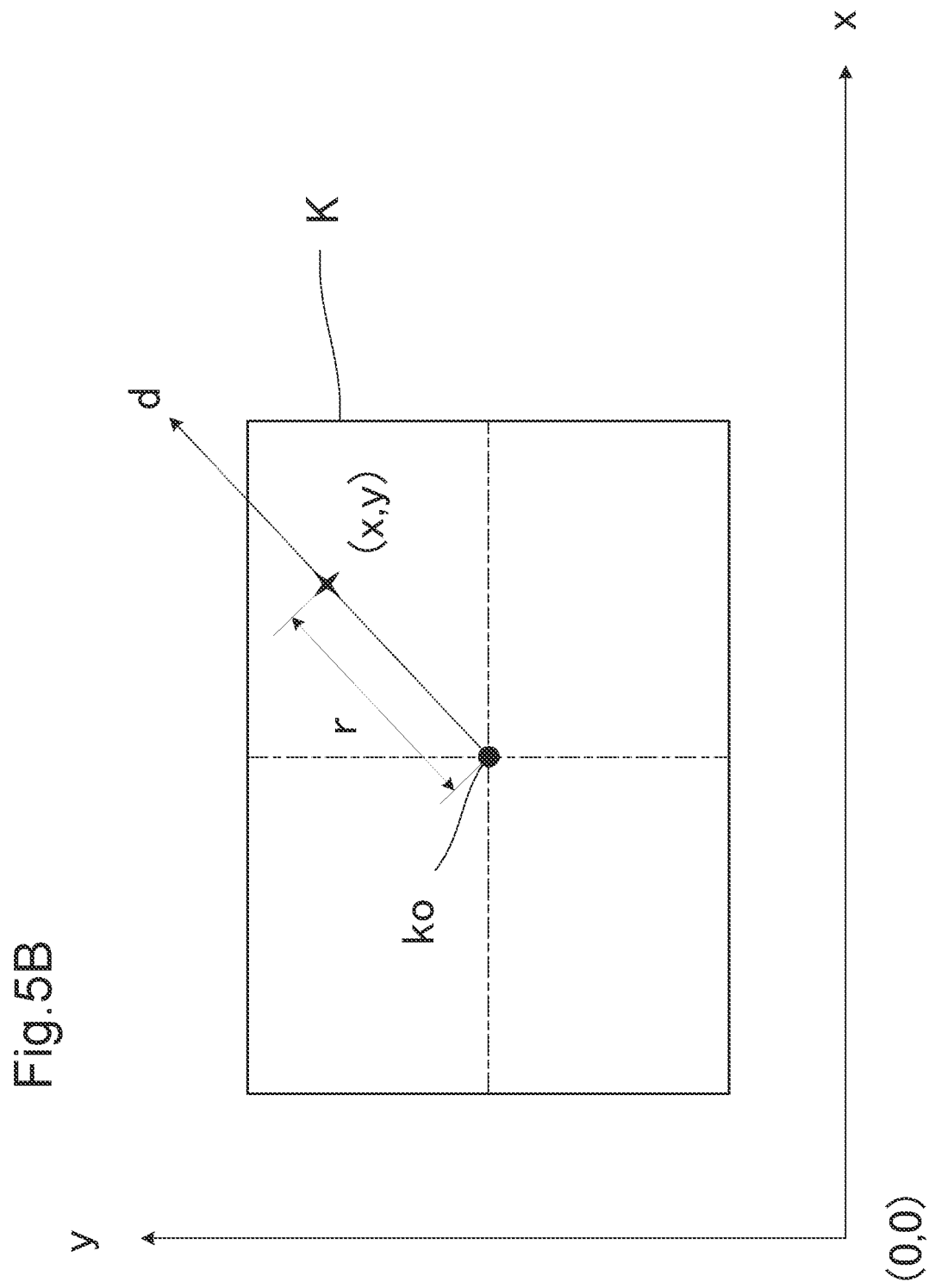

For example, as shown in FIG. 5A, when the coordinate (x, y) of the fingertip once enters a spatial object K on the xy-coordinate, at the start of a first contactless touch operation performed on the spatial coordinate system, but then deviates from the spatial object K at the end of the first contactless touch operation, the controller 14 cancels the first contactless touch operation. Then, when the coordinate of the fingertip performing a second contactless touch operation enters the same spatial object K, the controller 14 detects the shift of the coordinate (x, y) of the fingertip at the start of the first contactless touch operation, with respect to a center ko of the spatial object K, as shown in FIG. 5B, and corrects the position of the spatial object K in the spatial coordinate system, on the basis of the detected position shift. More specifically, the controller 14 brings the center ko of the spatial object K to the position coinciding with the coordinate (x, y) at the start of the first contactless touch operation, as shown in FIG. 5C. Accordingly, the user can accurately perform the second contactless touch operation in the vicinity of the center ko of the spatial object K, despite committing the position shift similar to that in the first contactless touch operation, in the second contactless touch operation.

Figure 6A:
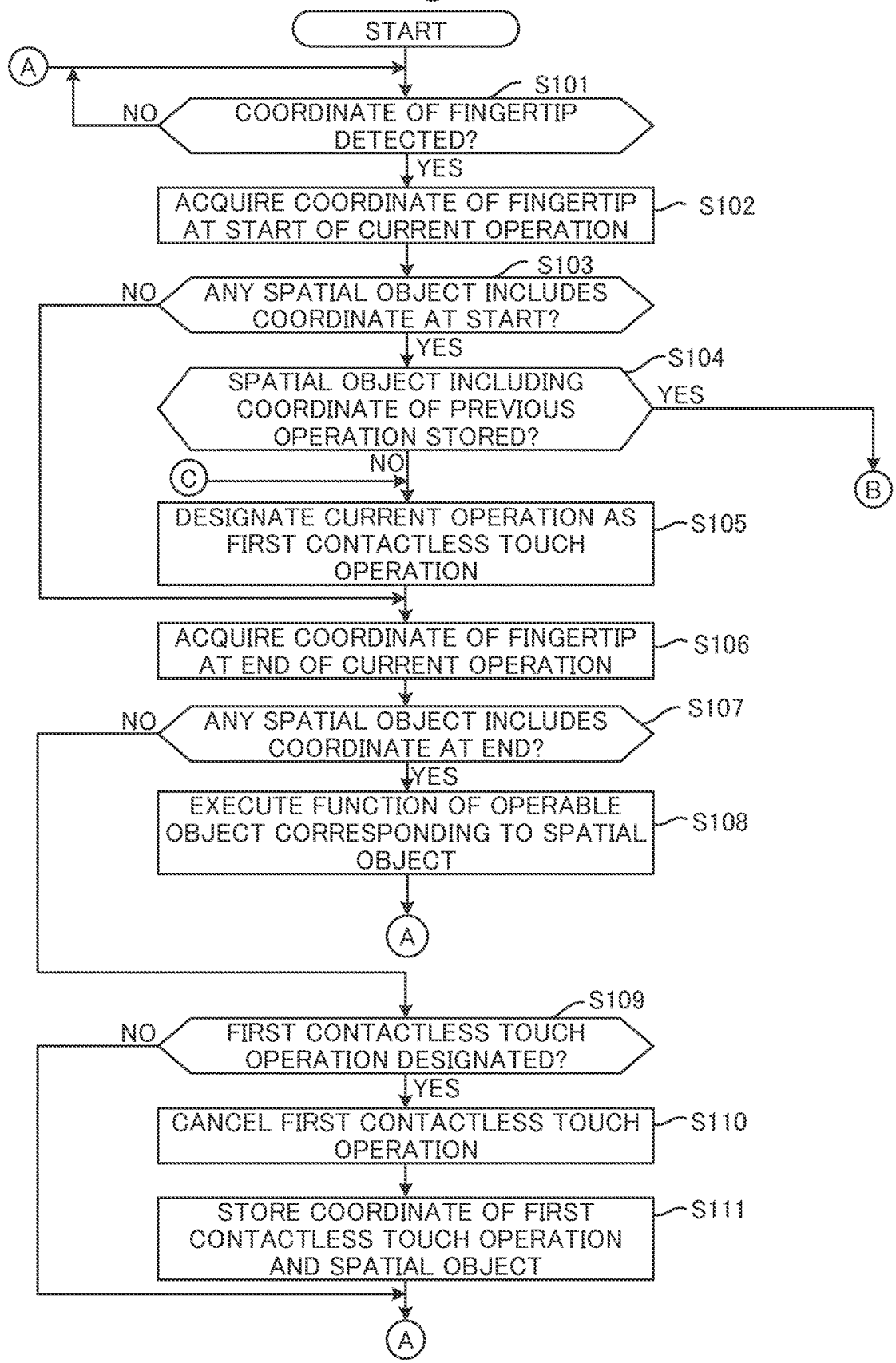
FIG. 6A is a flowchart showing a process of the position correction operation.
Figure 6B:
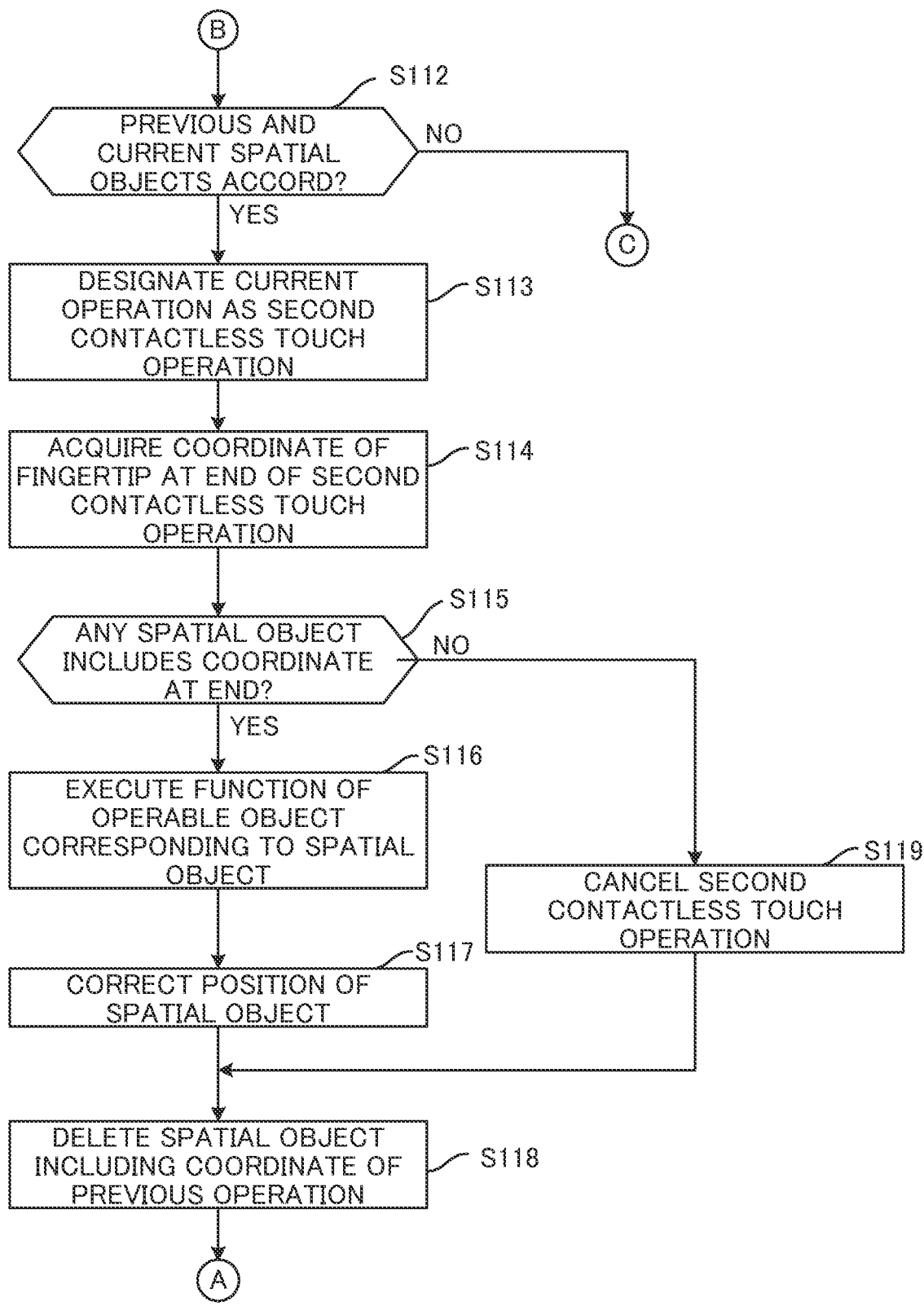
FIG. 6B is a flowchart showing a process subsequent to FIG. 6A.

Hereunder, the process of the position correction, including correcting the position of the spatial object so as to make the center of the spatial object coincide with the position of the fingertip performing the contactless touch operation, on the basis of the position shift of the fingertip performing the contactless touch operation, will be described in detail with reference to flowcharts shown in FIG. 6A and FIG. 6B.

It is assumed here that the controller 14 has looked up the position data of the operable objects registered in the coordinate table DT stored in the storage device 13, and caused the display device 11 to display the operable objects such as the button, the key, and the icon, on the screen 11A.

Under the mentioned condition, the user brings the fingertip close to the button 21 on the screen 11A so as to locate the fingertip inside the spatial object corresponding to the operable object of the button 21, thereby performing the contactless touch operation on the spatial object.

The controller 14 is standing by for the detection of the coordinate (x, y) of the fingertip by the contactless position detector 12 (No at step S101), and when the detection of the coordinate (x, y) of the fingertip is started (Yes at step S101), the controller 14 acquires the coordinate (x, y) of the fingertip at the start of the current contactless touch operation (step S102). The controller 14 further looks up the position data of the spatial objects registered in the coordinate table DT in the storage device 13, to thereby decide whether any of the spatial objects includes the coordinate (x, y) of the fingertip at the start of the current contactless touch operation (step S103). At the same time, the controller decides whether the coordinate (x, y) of the fingertip at the start of the previous contactless touch operation, and the spatial object including such coordinate (x, y) of the fingertip, are stored in the storage device 13 (step S104).

Upon deciding that one of the spatial objects includes the coordinate (x, y) of the fingertip at the start of the current contactless touch operation (Yes at step S103), and that the spatial object including the coordinate (x, y) of the fingertip at the start of the previous contactless touch operation is not stored in the storage device 13 (No at step S104), the controller 14 designates the current contactless touch operation as the first contactless touch operation (step S105).

In contrast, upon deciding that none of the spatial objects includes the coordinate (x, y) of the fingertip at the start of the current contactless touch operation (No at step S103), the controller 14 skips the operation of step S104 and step S105, and proceeds to step S106.

Then the controller 14 acquires the coordinate (x, y) of the fingertip at the end of the current contactless touch operation, detected by the contactless position detector 12, in other words the coordinate (x, y) of the fingertip immediately before the user separates the fingertip from the spatial object (step S106). After step S106, the controller 14 looks up the position data of the spatial objects in the coordinate table DT stored in the storage device 13, to thereby decide whether any of the spatial objects includes the coordinate (x, y) of the fingertip at the end of the current contactless touch operation (step S107).

It is assumed here that the user has moved the fingertip in a direction away from the screen 11A, from the spatial object corresponding to the operable object of the button 21. In this case, the controller 14 decides that one of the spatial objects includes the coordinate (x, y) of the fingertip at the end of the current contactless touch operation (Yes at step S107). Then the controller 14 retrieves the operable object corresponding to the mentioned spatial object from the coordinate table DT, and executes the function corresponding to the button 21, which is the retrieved operable object, according to the contactless touch operation performed thereon (step S108).

In the case where, in contrast, the user has unintentionally moved the fingertip to outside of the spatial object on the xy-coordinate, owing to the positional fluctuation of the fingertip, or intentionally moved the fingertip to outside of the spatial object on the xy-coordinate, the controller 14 decides that none of the spatial objects includes the coordinate (x, y) of the fingertip at the end of the current contactless touch operation (No at step S107), and decides whether the current contactless touch operation was designated as the first contactless touch operation at step S105 (step S109). In the case where the current contactless touch operation was designated as the first contactless touch operation (Yes at step 109), the controller 14 cancels the current designation of the first contactless touch operation (step S110), and stores the coordinate (x, y) of the fingertip at the start of the first contactless touch operation that has been cancelled, acquired at step S102, and the spatial object identified at step S103, in the storage device 13 (step S111). After step S111, the controller 14 returns to step S101.

In contrast, in the case where the current contactless touch operation was not designated as the first contactless touch operation at step S105 (No at step S109), the controller 14 returns to step S101, without performing the operation of step S110 and step S111.

Therefore, when the user performs the first contactless touch operation, by bringing the fingertip close to the button 21 on the screen 11A of the display device 11 and moving the fingertip to inside of the spatial object corresponding to the operable object of the button 21, and then moves the fingertip in a direction away from the screen 11A from the spatial object, the button 21 which is the operable object corresponding to the spatial object is retrieved from the coordinate table DT, and the function corresponding to the button 21 is executed, through the first contactless touch operation.

In contrast, when the user once performs the first contactless touch operation by moving the fingertip to inside of the spatial object corresponding to the operable object of the button 21, but moves the fingertip to outside of the spatial object on the xy-coordinate, the designation of the first contactless touch operation is cancelled, and the coordinate of the first contactless touch operation and the spatial object including such coordinate are stored in the storage device 13.

Here, in the case where the coordinate at the start of the current contactless touch operation is not moved to inside of the spatial object (No at step S103), and the coordinate at the end of the current contactless touch operation is not inside of the spatial object either (No at step S109), the controller 14 does not execute the function corresponding to the operable object according to the contactless touch operation performed thereon, and does not store the coordinate of the current contactless touch operation and the spatial object including such coordinate in the storage device 13. In this case, the controller 14 repeats the operations of step S101 to step S111.

Here, it is assumed that the user has once performed the first contactless touch operation as above, by moving the fingertip to inside of the spatial object corresponding to the operable object of the button 21, but has moved the fingertip to outside of the spatial object on the xy-coordinate, so that the designation of the first contactless touch operation has been cancelled. Then the user again brings the fingertip close to the button 21 on the screen 11A, in an attempt to again perform the contactless touch operation on the spatial object, and moves the fingertip to inside of the spatial object corresponding to the operable object of the button 21, thus performing the contactless touch operation on the spatial object again.

When the contactless position detector 12 starts to detect the coordinate (x, y) of the fingertip (Yes at step S101), the controller 14 acquires the coordinate (x, y) of the fingertip at the start of the current contactless touch operation (step S102), and looks up the position data of the spatial objects in the coordinate table DT stored in the storage device 13, to thereby decide that one of the spatial objects includes the coordinate (x, y) of the fingertip at the start of the current contactless touch operation (Yes at step S103). The controller 14 then decides whether the coordinate (x, y) of the fingertip at the start of the previous contactless touch operation, and the spatial object including such coordinate (x, y) of the fingertip, are stored in the storage device 13 (step S104).

Since the designation of the first contactless touch operation has been cancelled as above, the coordinate (x, y) of the fingertip at the time starting the first contactless touch operation that has been cancelled, and the spatial object including such coordinate (x, y) of the fingertip are stored in the storage device 13, at step S111. Accordingly, the controller 14 decides that the coordinate (x, y) of the fingertip at the start of the previous contactless touch operation, and the spatial object including such coordinate (x, y) of the fingertip, are stored in the storage device 13 (Yes at step S104). In this case, the controller 14 decides whether the spatial object stored in the storage device 13 accords with the spatial object that includes the coordinate (x, y) of the fingertip at the start of the current contactless touch operation, identified at step S103 (step S112). Upon deciding that these spatial objects accord with each other (Yes at step S112), the controller 14 designates the current contactless touch operation as the second contactless touch operation (step S113).

In other words, upon cancelling the designation of the first contactless touch operation on the spatial object corresponding to the operable object of the button 21, the controller 14 stores the coordinate (x, y) of the fingertip at the start of the first contactless touch operation and the spatial object that includes such coordinate (x, y) of the fingertip, in the storage device 13. Then when the contactless touch operation is again performed on the same spatial object, and the spatial object stored in the storage device 13 accords with the spatial object that includes the coordinate (x, y) of the fingertip at the start of the current contactless touch operation, the controller 14 designates the current contactless touch operation as the second contactless touch operation.

The controller 14 acquires the coordinate (x, y) of the fingertip at the end of the second contactless touch operation, detected by the contactless position detector 12 (step S114), and looks up the position data of the spatial objects in the coordinate table DT stored in the storage device 13, to thereby decide whether any of the spatial objects includes the coordinate (x, y) of the fingertip at the end of the second contactless touch operation (step S115).

When the user moves the fingertip in a direction away from the screen 11A from the spatial object corresponding to the operable object of the button 21, the controller 14 looks up the position data of the spatial objects in the coordinate table DT stored in the storage device 13, to thereby decide that one of the spatial objects includes the coordinate (x, y) of the fingertip at the end of the second contactless touch operation (Yes at step S115). Then the controller 14 retrieves the operable object corresponding to the spatial object from the coordinate table DT, and executes the function corresponding to the operable object, according to the contactless touch operation performed thereon (step S116).

The controller 14 further detects the position shift of the coordinate (x, y) of the fingertip at the start of the first contactless touch operation, with respect to the center of the spatial object, and calculates the position data of the spatial object, the center of which coincides with the coordinate (x, y) of the fingertip at the start of the first contactless touch operation, on the basis of the detected position shift. Then the controller 14 registers the calculated position data of the spatial object in the coordinate table DT, thereby updating the coordinate table DT (step S117). In the case where, for example, the first contactless touch operation is cancelled because the coordinate (x, y) of the fingertip has moved to outside of the spatial object K at the end of the first contactless touch operation, as shown in FIG. 5A, and the coordinate (x, y) of the fingertip of the second contactless touch operation enters the same spatial object K, the controller 14 calculates the distance r of the position shift between the center ko of the spatial object K and the coordinate (x, y) of the fingertip at the start of the first contactless touch operation, and the direction d of the coordinate (x, y) of the fingertip at the start of the first contactless touch operation with respect to the center ko of the spatial object K, as shown in FIG. 5B. The controller 14 calculates the position data of the spatial object K, where the center ko of the spatial object K coincides with the coordinate (x, y) at the start of the first contactless touch operation, on the basis of the distance r and the direction d calculated as above, as shown in FIG. 5C, and registers the calculated position data of the spatial object K in the coordinate table DT, thereby updating the coordinate table DT. In this case, the calculated position data of the spatial object K represents the coordinate (x, y) of each of the corners of the spatial object K, having the coordinate (x, y) of the fingertip at the start of the first contactless touch operation, at the center.

Accordingly, even when the user repeats the contactless touch operation on the operable object of the button 21, with the position shift like that in the first contactless touch operation, the position of the contactless touch operation can be made to generally coincide with the center ko of the spatial object K. Therefore, the user can surely perform the contactless touch operation on the spatial object K, to input the instruction through the operable object corresponding to the spatial object K.

After step S117, the controller 14 deletes the coordinate (x, y) of the fingertip at the start of the first contactless touch operation, and the spatial object that includes such coordinate (x, y) of the fingertip, from the storage device 13 (step S118). After step S118, the controller 14 returns to step S101.

In contrast, when the user moves the fingertip to outside of the spatial object, the controller 14 decides that none of the spatial objects includes the coordinate (x, y) of the fingertip at the end of the second contactless touch operation (No at step S115). In this case, the controller 14 cancels the designation of the second contactless touch operation (step S119), and deletes the coordinate (x, y) of the fingertip at the start of the first contactless touch operation, and the spatial object that includes such coordinate (x, y) of the fingertip, from the storage device 13 (step S118). After step S118, the controller 14 returns to step S101.

Here, after performing the first contactless touch operation on the button 21 displayed on the screen 11A, the user may bring the fingertip close to another button on the screen 11A, and move the fingertip to the spatial object corresponding to the operable object of the other button, thus to perform the contactless touch operation on such spatial object. In this case, when the contactless position detector 12 starts to detect the coordinate (x, y) of the fingertip (Yes at step S101), the controller 14 acquires the coordinate (x, y) of the fingertip at the start of the current contactless touch operation (step S102), and looks up the position data of the spatial objects in the coordinate table DT stored in the storage device 13, to thereby identify the spatial object that includes the coordinate (x, y) of the fingertip at the start of the current contactless touch operation (Yes at step S103). The controller 14 may (1) decide that the spatial object that includes the coordinate (x, y) of the fingertip at the start of the previous contactless touch operation is not stored in the storage device 13 (No at step S104), and designate the current contactless touch operation as the first contactless touch operation (step S105). Otherwise, the controller 14 may (2) decide, despite deciding that the spatial object that includes the coordinate (x, y) of the fingertip at the start of the previous contactless touch operation is stored in the storage device 13 (Yes at step S104), that the spatial object stored in the storage device 13 discords with the spatial object identified at step S103, which includes the coordinate (x, y) of the fingertip at the start of the current contactless touch operation (No at step S112), and designate the current contactless touch operation as the first contactless touch operation (step S105). After step S105, the controller 14 proceeds to step S106 and the subsequent steps.

In this embodiment, as described above, when the designation of the first contactless touch operation is cancelled, because the user has moved the fingertip to outside of the spatial object on the xy-coordinate, halfway of performing the first contactless touch operation on the spatial object corresponding to the operable object of the button 21, and therefore the user has performed the second contactless touch operation on the same spatial object, in an attempt to again perform the contactless touch operation on the same spatial object, so that the function corresponding to the button 21 is executed according to the second contactless touch operation, the controller 14 detects the position shift of the coordinate (x, y) of the fingertip at the start of the first contactless touch operation with respect to the center of the spatial object, and corrects the position of the spatial object on the basis of the detected position shift, such that the center of the spatial object coincides with the coordinate (x, y) of the fingertip at the start of the first contactless touch operation. Accordingly, even when the user repeats the contactless touch operation with the position shift like that in the first contactless touch operation, the position of the contactless touch operation can be made to coincide with the center of the spatial object. Therefore, the user can surely perform the contactless touch operation on the spatial object, to input the instruction through the operable object corresponding to the spatial object.

Consequently, when the contactless touch operation on the spatial object corresponding to the operable object is performed with a position shift, the position of the spatial object can be corrected, and the contactless touch operation on the spatial object can be prevented from being performed on a wrong position.

When log-out, reset, or reboot of the display and input device 1 is instructed, the controller 14 executes the log-out, reset, or reboot according to the instruction, and initializes the coordinate table DT thereby resetting the position data of the spatial object in the coordinate table DT, to the initial data.

In addition, upon calculating the distance r of the position shift between the center of the spatial object K and the coordinate (x, y) of the fingertip at the start of the first contactless touch operation, and the direction d of the coordinate (x, y) of the fingertip at the start of the first contactless touch operation with respect to the center of the spatial object K, the controller 14 may correct the position of the spatial object on the basis of the calculated distance r and the direction d, such that the center of the spatial object coincides with the coordinate (x, y) of the fingertip at the start of the first contactless touch operation, when the distance r is equal to or longer than a predetermined threshold, but keep from correcting the position of the spatial object, when the distance r is shorter than the predetermined threshold.

In the foregoing embodiment, the controller 14 detects the position shift of the coordinate (x, y) of the fingertip at the start of the first contactless touch operation with respect to the center of the spatial object, and corrects the position of the spatial object on the basis of the detected position shift, such that the center of the spatial object coincides with the coordinate (x, y) of the fingertip at the start of the first contactless touch operation. However, the disclosure is not limited to such embodiment. For example, the controller 14 may detect the position shift of the coordinate (x, y) of the fingertip at the start of the second contactless touch operation, or position shift of the coordinate (x, y) of the fingertip at the end of the second contactless touch operation, with respect to the center of the spatial object, and correct the position of the spatial object on the basis of the detected position shift, such that the center of the spatial object coincides with the coordinate (x, y) of the fingertip at the start of the second contactless touch operation, or the coordinate (x, y) of the fingertip at the end of the second contactless touch operation.

When a spatial object interferes with another spatial object, because of the position of the first mentioned spatial object having been corrected, the controller 14 may also correct the position of the other spatial object, like that of the first mentioned spatial object. As result, the interference between these spatial objects can be avoided.

Although the contactless position detector 12 according to the foregoing embodiment includes a plurality of sensors arranged on the screen 11A, to detect the position of the fingertip on the basis of the electrostatic capacitance between the plurality of sensors and the fingertip that has come close to the screen 11A, a different method may be adopted to detect the position of the fingertip. For example, the contactless position detector 12 may include a light emitting device that emits infrared light or laser light, and a photodetector that receives the reflected light, to emit the infrared light or laser light from the light emitting device to the fingertip, and detect the position thereof on the basis of the reflected light received by the photodetector.

Further, the configurations and processings according to the foregoing embodiment, described with reference to FIG. 1 to FIG. 6B, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A display and input device comprising:
    a display device that displays an operable object on a screen;
    a contactless position detector that detects a first start position and a first finish position of a first contactless touch operation performed on a spatial object, predefined at a position corresponding to the operable object and separated from the screen by a predetermined distance;
    a storage device; and
    a controller includes a processor, and configured, when the processor executes a control program, to:
        execute, when the first start position and the first finish position are inside of the spatial object, processing according to the first contactless touch operation;
        cancel, when the first start position is inside of the spatial object and the first finish position is outside of the spatial object, the first contactless touch operation and store the first start position and the spatial object in the storage device;
        execute, when the contactless position detector detects a second start position and a second finish position of a second contactless touch operation, which is another contactless touch operation following the first contactless touch operation, on the spatial object and when the second start position and the second finish position are inside of the spatial object, processing according to the second contactless touch operation and detect a position shift of the first start position with respect to a center of the spatial object; and
        correct the position of the spatial object by making the center of the spatial object, with respect to the first start position, coincide with the position of the first start position, contactless touch operation, on a basis of the detected position shift.

2. The display and input device according to claim 1, wherein the controller detects a distance between the center of the spatial object and the position of the first start position, and a direction of the position of the first start position with respect to the center of the spatial object, and corrects the position of the spatial object by making the center of the spatial object coincide with the position of the first start position, on a basis of the distance and the direction detected, when the detected distance is equal to or longer than a predetermined threshold, but keeps from correcting the position of the spatial object, when the detected distance is shorter than the predetermined threshold.

3. The display and input device according to claim 1, wherein the controller resets the position of the spatial object to an initial position, according to an instruction to log out from, reset, or reboot the display and input device.

4. The display and input device according to claim 1, when the second start position and the second finish position are inside of the spatial object, the controller corrects the position of the spatial object by making the center of the spatial object coincide with the second start position, on a basis of the position shift of the second start position with respect to the center of the spatial object.

5. The display and input device according to claim 1, wherein, when the second start position and the second finish position are inside of the spatial object, the controller corrects the position of the spatial object by making the center of the spatial object coincide with the second finish position, on a basis of the position shift of the second finish position with respect to the center of the spatial object.

* * * * *